E. L. FREEMAN.
Cultivator.
No. 9,796.
Patented June 21, 1853.
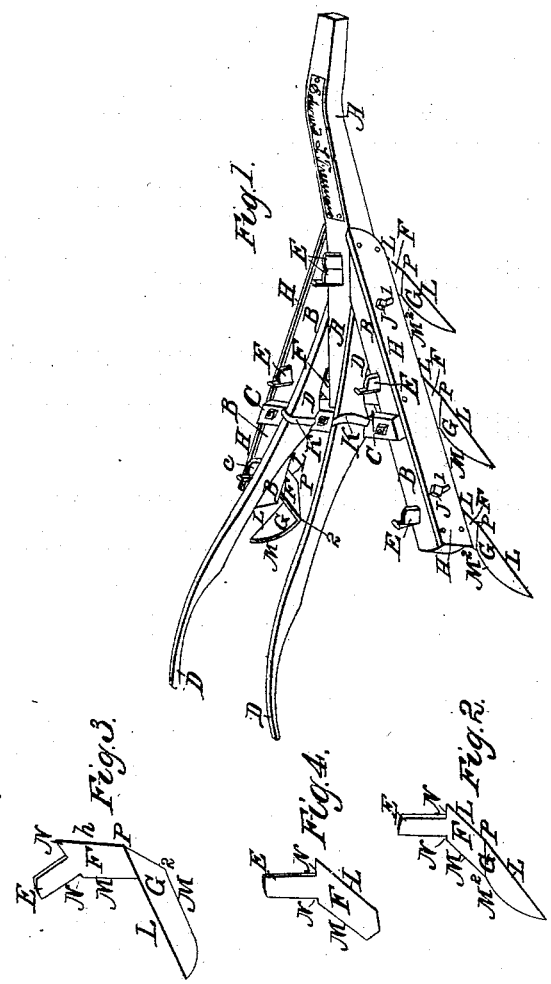

UNITED STATES PATENT OFFICE.

E. L. FREEMAN, OF ANN ARBOR, MICHIGAN.

IMPROVEMENT IN BOG-CUTTING CULTIVATORS.

Specification forming part of Letters Patent No. 9,796, dated June 21, 1853.

*To all whom it may concern:*

Be it known that I, EDMUND L. FREEMAN, of Ann Arbor, in the county of Washtenaw and State of Michigan, have invented a new and useful Machine for Cultivating Marshes; and I do hereby declare that the following is a full, clear, and exact description of the construction and operation of the same, reference being had to the annexed drawings, making a part of this specification.

The wood-work or body of the machine, without the side guides or gages, very closely resembles the common beam cultivator-frame; but the teeth, knives, or colters can be used in any kind of cultivator-frame, or in the frame of the ordinary V drag or harrow, either with or without handles or side guides, or in any other shaped frame in which the teeth or knives can be so set as to run steady and cut over the whole surface at the required depth. For convenience, and to insure steadiness of motion and the control of the machine, a beam somewhat resembling an inverted plow-beam extending from the cross-piece to such distance and height in front as will secure the best motion, with side pieces united thereon and bolted through or otherwise fastened together with a cross-piece and handles, and guides on the outsides of the side pieces, is recommended. It is an improvement in making the frame to connect the forward ends of the side pieces and handles with the beam, as shown in the annexed drawings, and fasten all together with a bolt or bolts passing through all.

In the beam and side pieces of the frame are set so many colters, knives, or teeth as may be sufficient to cut over the whole width of ground which the frame covers, or more. From six to twelve teeth would ordinarily be used, according to the size of the frame and the width cut by each knife. The mortises in the side pieces are made parallel to the line of the beam to receive and hold the shank of the tooth or colter, and the shank of the tooth or colter is made and fastened in like the ordinary solid shank of cultivator-teeth, or in any other method which will hold the tooth firm in its place. As the thickness of the shank will be less than that of cultivator-teeth generally, and as all resistance on the edge of the knife will produce a kind of twisting strain on the shank, it would probably be better (if not necessary) to protect the mortise by an iron plate or plates, or bolts or rivets. The colter, or the part of the tooth or knife next the shank, extends downward, slanting backward at an angle of about forty-five degrees, or such degree of inclination as may be found sufficient to keep the colter or teeth from clogging or choking with rubbish and not prevent its running down. All the part of the tooth, colter, or knife below the bottom of the side piece of the frame is brought to a sharp edge. The shoulder or shoulders occasioned by the increase in the width of the colter below the shank by bringing the colter to an edge may extend backward and forward of the shank, or in either direction, as the desire to give strength or support to the tool or colter may suggest; but the edge should be continued straight up to the frame to prevent clogging. From four to ten inches below the under side of the frame, according to the kind of use the machine is intended for, the colter or knife is bent diagonally across the blade, at right angles outward, so that the remaining or knife part of the tooth or colter lies nearly horizontal or parallel with the bottom of the frame, the edge being depressed a very little to incline it to run down sufficiently, and the knife or wing extending outward from six to twelve inches and slanting backward, so as to form an angle of from thirty-five to sixty degrees with the line of the furrow made by the colter or upright part of the tooth. The degree of slant or backward inclination of the colter and knife parts of the tooth would most naturally be made about the same, as the tooth is more easily forged straight with a continuous edge; but the degree of slant can be increased or lessened in both parts, or either, in making the tooth, as from use it should be judged best. The width and thickness of the blade of the knife or colter should be sufficient to give it the degree of strength required, and may be varied as the length of the colter or knife varies or the use for which the machine is intended may require or permit. The side guides or sliding gages to govern the depth at which the knives are intended to work can be made of plank, either with or without sheathing or protecting them with iron, and of any width which may be desired, and fastened upon the outside of the side pieces by screws or bolts passing through slits or mortises, which will allow them to be moved up or down and fastened at the desired height.

In the annexed drawings, Figure I is intended to present a perspective view of the machine; Fig. II, a side view of a tooth standing in the position in which its intended to work; and Fig. III, a perspective view of the tooth, showing the lower surface of the knife with the edge upward. Figs. II and III both represent teeth from the off side or right-hand side of the machine. The knives of the other side are bent the other way. Fig. IV is a side view of a colter to be placed between the teeth to cut the surface faster, when desired.

*Explanation of the letters on the drawings referring to different parts of the machine.*—A A, beam; B B B B, side pieces; C C, cross-piece; D D D D, handles; E E E E, the shank part of the tooth; F F F F, the colter part of the tooth; G G G G, the knife part of the tooth; H H, movable guide or sliding gage; I I, mortises or slits in the sliding gages; J J, screws to fasten the sliding gages to the side pieces; K K, staples fastening the handles to the cross-pieces; L L L L, edge, and M M M M back, of colter or knife; N N N N, shoulders of the colters; O O O, heads of the bolts fastening the cross-piece to the side pieces and beam; P P P P, the point in the edge; and Q Q Q Q, the point in the back of the colter, where it is bent or turned diagonally across the blade at right angles outward.

The use for which the machine is principally intended is to cut off bogs and smooth the surface of marsh-meadows when free from stones, and to cut up and prepare the surface of marshes for receiving and covering any kind of grass or other seed sown upon it. The bogs and turf, when severed, can be removed from the ground, if necessary, or be reduced to any degree of fineness desired by continuing the use of the machine. By placing between the teeth colters like the other teeth with the knife part left off the turf can be cut to pieces faster.

Where it is an object to cut up the turf very fine or very fast, as where it is desirable to destroy the wild grass and sow millet, oats, or any kind of grain with grass-seed, by making additional mortises in the frame two or more sets of teeth with colters of different lengths can be placed in the same frame, taking care to place a short and a long coltered tooth alternately, so that the short teeth shall precede the long ones, and each set cut over the whole surface at different depths.

By a little variation in the shape of the frame, when necessary, and by placing wheels or rollers under the frame back of the teeth, so as to elevate the knives above the surface of the ground, the machine could probably be used for cutting up corn, sugar-cane, or any growth of vegetation the stalks of which were sufficiently stiff and tender to be severed by the pressure of the knife against the side of the stalk near the ground.

What I claim as my invention, and desire to secure by Letters Patent, is—

The precise construction of the tooth, and placed in the position as set forth—that is to say, the vertical part and the horizontal—each having a backward slant.

<div style="text-align: right;">EDMUND L. FREEMAN.</div>

Witnesses:
A. W. MORGAN,
WM. A. FLETCHER.